UNITED STATES PATENT OFFICE.

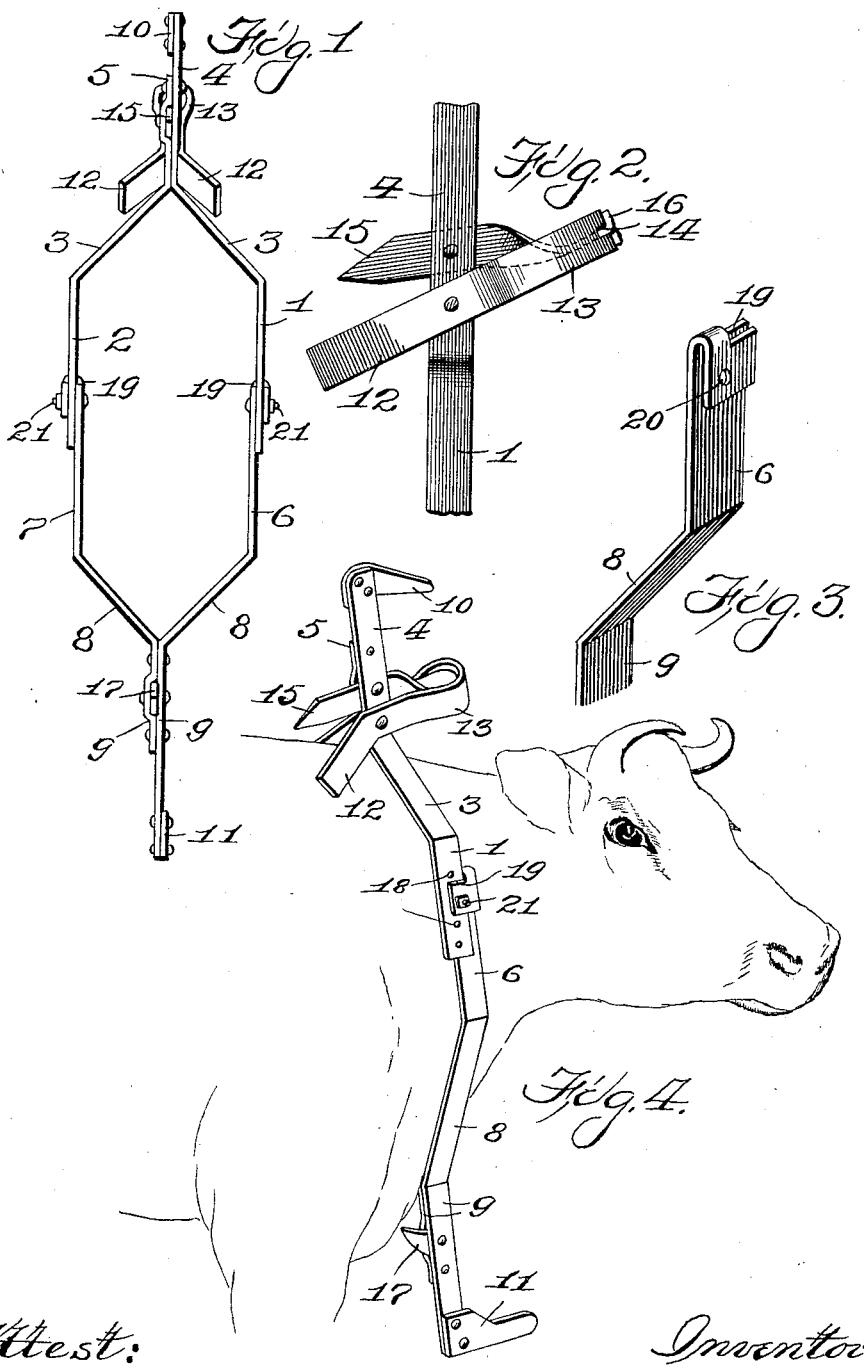

DANIEL M. INGLISH, OF GOODWIN, OKLAHOMA.

ANIMAL-POKE.

1,042,116.  Specification of Letters Patent.  Patented Oct. 22, 1912.

Application filed May 31, 1911. Serial No. 630,479.

*To all whom it may concern:*

Be it known that I, DANIEL M. INGLISH, a citizen of the United States, and resident of Goodwin, Ellis county, Oklahoma, have invented certain new and useful Improvements in Animal-Pokes, of which the following is a specification containing a full, clear, and exact description, reference being had to the accompanying drawings, forming a part hereof.

My invention relates to improvements in animal pokes, and the object of my invention is to generally improve that class of animal pokes which is carried by the animal, the improvements consisting in a generally cheapened structure and a structure which assures the pricking or prodding of an animal when it attempts to go through a wire fence.

With the above purposes in view my invention consists in certain novel features of construction and arrangement of parts as will be hereinafter more fully described, pointed out in the claim and illustrated by the accompanying drawings, in which—

Figure 1 is a rear elevation of the complete device; Fig. 2 is a side elevation of a portion of the upper section of the yoke showing the construction of the upper spur and the guide therefor; Fig. 3 is a fragmental perspective view of one of the extremities of the lower section of the device; and Fig. 4 is a perspective of the complete poke in position upon an animal.

Referring by numerals to the accompanying drawings: 1 and 2 designate the lower parallel and spaced apart ends of the upper section of the device.

3—3 designate integral portions of the members 1 and 2 which are bent at an angle substantially 45° and terminate in parallel portions 4 and 5 which are united preferably by rivets to form the upper stem of the device.

6 and 7 designate the parallel spaced apart portions of the lower section of the device, the lower section having portions 8 bent at an angle of substantially 45°, and the ends 9 which are united to form the lower stem of the device.

Secured to the free end of the upper stem is a hook 10 and secured to the lower extremity of the lowermost stem is a hook 11. Secured to the uppermost stem is a member having flaring wings 12 which extend rearwardly, the member on the end opposed to the end forming the wings being formed into a loop 13, the outer end of which is slotted at 14. Secured to the upper stem, immediately above the member forming the wings 12, there is a spur 15, the end of the spur opposed to its sharpened end being split or bifurcated, and the bifurcated ends 16 being inserted through the slot 14 and bent, thereby securing the spur and the member forming the wings 12 against movements relative each other. Carried by the stem of the lowermost section there is a spur 17 which extends in the same direction as the spur 15.

The ends 1 and 2 of the uppermost section are each provided with a series of perforations 18, and the upper ends of the portions 6 and 7 of the lower section, as shown in Fig. 3, are bent or doubled over the body of the portions 6 and 7, the bent or doubled portion being cut away at 19 to straddle the portions 1 and 2 of the upper section. The bent ends of the portions 6 and 7 are provided with openings 20 through which the bolts 21 are passed so that the upper and lower sections may be hinged over each other.

The bent ends of the lower sections form practically a one-way or knuckle joint which permits the upper and lower sections of the device to hinge rearwardly but not forwardly.

In use the device is applied as shown in Fig. 4. By means of the bolt 21 and the perforations 18 the device may be adjusted to fit animals of different sizes.

The device when in place upon the animal rests upon the animal's back and if the animal attempts to pass through a wire fence either the hook 10 or the hook 11 will engage with one of the strand wires of the fence. If the hook 11 catches in the fence the spur 17 will prick the animal in a manner common to such devices. If the hook 10 is caught in the fence the spur 15 will prick the animal.

In animal pokes of this kind without a device such as the wings 12 the animals may, by turning their heads sidewise, position the spur to one side of their backs so that it will not prick the back. By the employment of the wings 12 such an operation cannot be accomplished, the wings 12 straddling the back and thus guiding the spur to prick the top of the back.

I claim:

In an animal poke, a pair of members arranged to embrace the animal's neck, means for pivotally and adjustably connecting said members, an extension carried by each member, a hook at the extremity of each extension, a spur secured to one of said extremities, the body of the spur projecting beyond both sides of said extremity, a pair of wings secured to said extremity beneath said spur, the body portions of said wings extending on both sides of said extremity, the forward ends of said wings being secured to the forward end of said spur.

In testimony whereof, I have signed my name to this specification, in presence of two subscribing witnesses.

DANIEL M. INGLISH.

Witnesses:
M. H. INGLISH,
R. S. OATES.

Copies of this patent may be obtained for five cents each, by addressing the "Commissioner of Patents, Washington, D. C."